(12) United States Patent
DeRosa et al.

(10) Patent No.: US 11,187,606 B2
(45) Date of Patent: Nov. 30, 2021

(54) PRESSURE TRANSDUCER WITH INTEGRAL BLEED VALVE

(71) Applicant: KULITE SEMICONDUCTOR PRODUCTS, INC., Leonia, NJ (US)

(72) Inventors: Louis DeRosa, Wayne, NJ (US); Elias Geras, Pearl River, NY (US); Robert Gardner, Westwood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 276 days.

(21) Appl. No.: 16/184,710

(22) Filed: Nov. 8, 2018

(65) Prior Publication Data

US 2019/0145844 A1   May 16, 2019

Related U.S. Application Data

(60) Provisional application No. 62/583,550, filed on Nov. 9, 2017.

(51) Int. Cl.
*G01L 19/14* (2006.01)

(52) U.S. Cl.
CPC .......... *G01L 19/145* (2013.01); *G01L 19/147* (2013.01)

(58) Field of Classification Search
None
See application file for complete search history.

(56) References Cited

U.S. PATENT DOCUMENTS

| | | | |
|---|---|---|---|
| 2,277,534 A * | 3/1942 | Thompson | G01L 19/0681 73/710 |
| 2,481,651 A * | 9/1949 | Fitzpatrick | G01L 19/0627 73/706 |
| 4,270,568 A * | 6/1981 | Gray | G01L 7/048 137/460 |
| 5,036,884 A * | 8/1991 | Miller | G01L 19/0015 137/597 |
| 5,192,425 A * | 3/1993 | Cyphers | B01D 29/90 210/90 |
| 5,955,771 A | 9/1999 | Kurtz | |
| 5,999,082 A | 12/1999 | Kurtz | |

(Continued)

OTHER PUBLICATIONS

Adam M. Hurst and Joe Vandeweert, A Study of Bulk Modulus, Entrained Air, and Dynamic Pressure Measurements in Liquids, ASME. J. Eng. Gas Turbines Power, The American Society of Mechanical Engineers Digital Collection, Apr. 26, 2016, 9 pages, Paper No. GTP-16-1109; doi: 10.1115/1.4033215.

*Primary Examiner* — Jill E Culler
(74) *Attorney, Agent, or Firm* — Troutman Pepper Hamilton Sanders LLP; James E. Schutz; Mark Lehi Jones

(57) ABSTRACT

The disclosed technology is a pressure transducer with a bleed valve built into the body of the transducer for purging liquid systems. The transducer assembly includes a body, a bleed valve port defined in the body and configured to accept a bleed valve, an interface port attached to the body, an adapter attached to a portion of the interface port, a header attached to the adapter and the body, a pressure transducer mounted to the header, and an internal cavity in communication with the interface port, the pressure transducer, and the bleed valve port. The bleed valve port is configured to vent a gas from the internal cavity. A bleed valve disposed in the bleed valve port is configured to controllably vent a gas from the internal cavity.

6 Claims, 4 Drawing Sheets

(56) References Cited

U.S. PATENT DOCUMENTS

| | | | | |
|---|---|---|---|---|
| 6,584,850 B2 * | 7/2003 | Colby | ................ | G01L 19/0007 |
| | | | | 73/700 |
| 6,899,317 B2 * | 5/2005 | Brady | ................ | F16K 37/0066 |
| | | | | 137/557 |
| 9,470,596 B2 | 10/2016 | DeRosa et al. | | |

* cited by examiner

PRESSURE TRANSDUCER WITH INTEGRAL BLEED VALVE

RELATED APPLICATIONS

This application claims priority to U.S. Provisional Patent Application Ser. No. 62/583,550, filed on 9 Nov. 2017, entitled: "Pressure Transducer with Integral Bleed Valve," the contents of which are hereby incorporated by reference in their entirety as if presented herein in full.

FIELD

The disclosed technology relates to a pressure transducer with a bleed valve built into the body of the transducer for purging liquid systems.

BACKGROUND

It is known that the presence of air and/or other gases in a pressurized liquid can greatly affect the properties of the system. For example, entrained air in brake systems and/or hydraulic systems can impact the bulk modulus of the liquid. As discussed in "A Study of Bulk Modulus, Entrained Air, and Dynamic Pressure Measurements in Liquids," Hurst A. M. and Joe VanDeWeert, ASME. J. Eng. Gas Turbines Power, The American Society of Mechanical Engineers Digital Collection, Apr. 26, 2016, the bulk modulus and the entrained/dissolved gas content within the liquid can greatly impact the observed frequency response of a pressure transducer monitoring the system.

Gases, such as air, mixed or dissolved into a fluid can also add substantial damping to the dynamic response of the fluid measurement system. Thus, knowledge of the bulk modulus and entrained and/or dissolved air may be needed for accurate measurement of the frequency response of a system when operating with a liquid media. However, it is not usually practical (or possible) to perform such bulk modulus measurements on such systems but, rather, it is desirable to be able to purge the gas out of these systems.

Air purging is normally accomplished via a standard bleed valve that allows a user to turn a plug, for example, to allow gas to escape. There are many times when the pressure of the system needs to be monitored for control, etc. In these cases, it is necessary to have a vent region in the system for the bleed valve, and another region for the pressure transducer. Such systems can be disadvantageous as it requires two openings in the system, which can increase the risk of leaks and add more bulk to the system. A need exists for systems and methods that address such issues.

BRIEF SUMMARY

Certain example implementations of the disclosed technology may include systems and methods for integrating a bleed valve into a transducer body for purging air from liquid systems.

The disclosed technology includes a transducer assembly having a body, a bleed valve port defined in the body and configured to accept a bleed valve, an interface port attached to the body, an adapter attached to a portion of the interface port, a header attached to the adapter and the body, a pressure transducer mounted to the header, and an internal cavity in communication with the interface port, the pressure transducer, and the bleed valve port, wherein the bleed valve port is configured to vent a gas from the internal cavity. In certain example implementations, a bleed valve is disposed in the bleed valve port and is configured to controllably vent a gas from the internal cavity.

The disclosed technology further includes a method of assembling a pressure transducer assembly. The method includes providing a body having a bleed valve port configured to accept a bleed valve, attaching an interface port to the body, securing an adaptor to a back side of the interface port, securing a header to the adapter, mounting a pressure transducer to the header, wherein, an internal cavity is defined between and in communication with the interface port, the pressure transducer, and the bleed valve port, and installing a bleed valve in the bleed valve port, wherein the bleed valve is configured to vent a gas from the internal cavity.

The disclosed technology includes a method of bleeding gas from a pressure port and measuring a pressure of a fluid in communication with the pressure port. The method includes installing the (above referenced) pressure transducer assembly in a pressure port, installing a bleed valve in the bleed valve port of the pressure transducer assembly, applying pressurized fluid to the pressure port, temporarily opening the bleed valve to allow gas to escape an internal cavity of the pressure transducer assembly, measuring, with the pressure transducer, a pressure of the applied pressurized fluid, and outputting, with the pressure transduce assembly, a signal corresponding to the measured pressure.

Other implementations, features, and aspects of the disclosed technology are described in detail herein and are considered a part of the claimed disclosed technology. Other implementations, features, and aspects can be understood with reference to the following detailed description, accompanying drawings, and claims.

DETAILED DESCRIPTION

Figure 1:
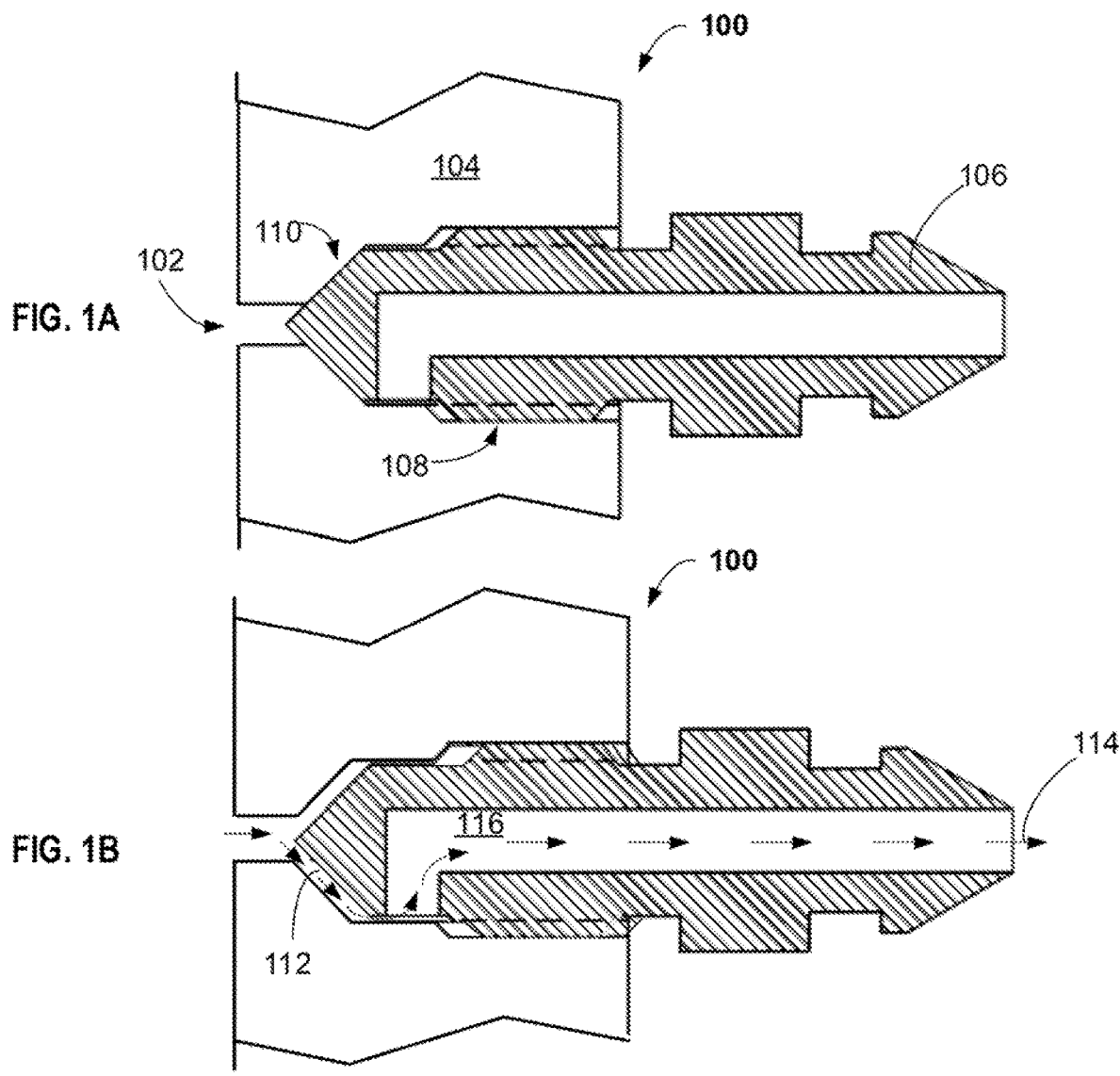
FIG. 1A depicts system 100 having a standard port 102 through a wall portion 104 of the system 100 in which a standard bleed valve 106 is installed and shown in a closed position.
FIG. 1B depicts the system 100 with the bleed valve 106 in a venting position.

The disclosed technology includes systems and methods related to a pressure transducer with an integral bleed valve built into the body of the pressure transducer. In accordance with certain example implementations of the disclosed technology, the integral bleed valve arrangement may provide an improved apparatus that enables bleeding air (or other gases) out of the system and monitoring pressure of a fluid in the system while utilizing only one access port to the system.

Certain example implementations include a transducer apparatus configured with an integrated bleed valve port, standard bleed valve front seal, and coupling arrangement, so it is possible to replace a normal bleed valve in an existing system without the need for new ports to be installed.

FIG. 1A depicts system 100 having a standard port 102 through a wall portion 104 (such as a pipe, header, etc.) of the system 100 in which a standard bleed valve 106 is installed and shown in a closed position. FIG. 1B depicts the system 100 with the bleed valve 106 in a venting position. The wall portion 104 and the bleed valve 106 may include corresponding threaded portions 108, for example, that allow the bleed valve 106 to be screwed into the port 102 such that a front cone 110 of the bleed valve 106 is pressed against a corresponding surface of the wall portion 104 to seal the port 102.

As depicted in FIG. 1B, when the bleed valve 106 is backed out slightly (for example, by turning or slightly unscrewing), a path 112 around the front cone 110 opens to allow air 114 to escape through a bore 116 in the center of the bleed valve 106, and out an open end to an external environment. In certain systems, the bleed valves 106 may be installed in a location that collects air and/or other gasses, for example at the top-most section of a system in which gasses will naturally rise and collect for easy venting.

Figure 2:
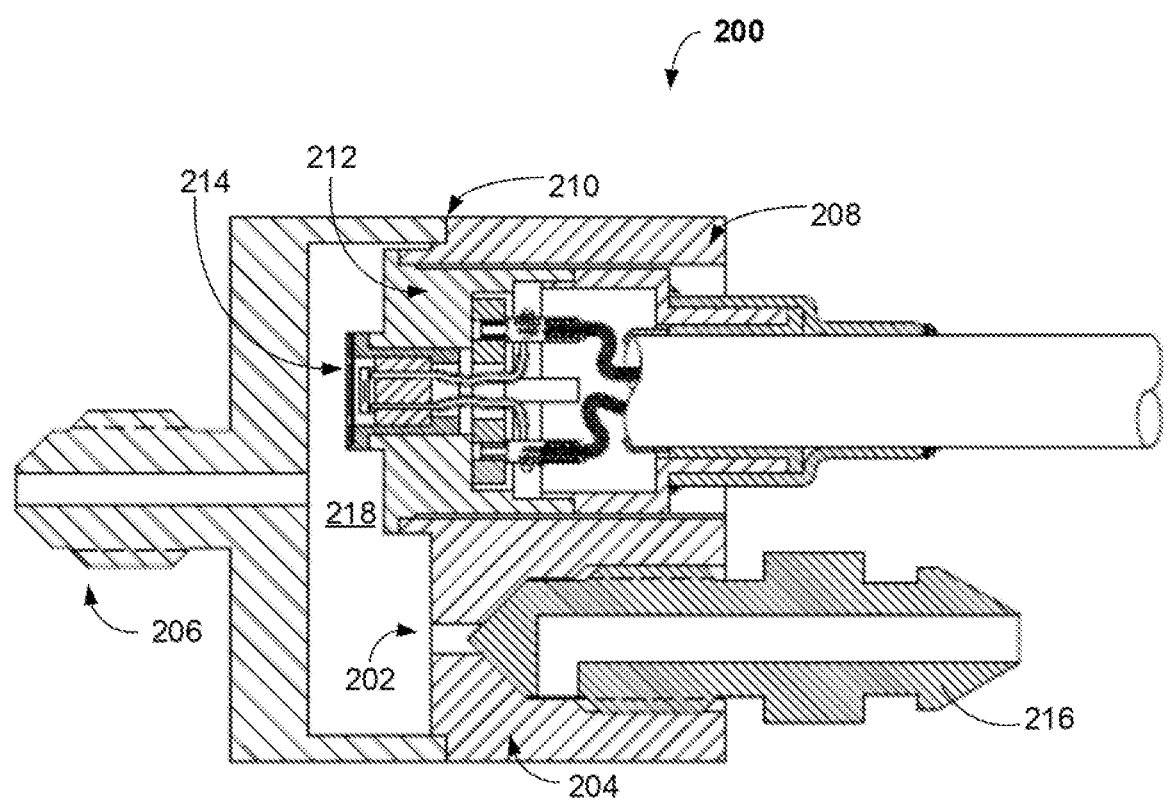
FIG. 2 depicts a pressure transducer assembly 200 having bleed valve port 202 built into the body 204 of the assembly 200, according to an example implementation of the disclosed technology.

FIG. 2 depicts a pressure transducer assembly 200 having a bleed valve port 202 built into the body 204 of the assembly 200, according to an example implementation of the disclosed technology. In accordance with certain example implementations, the transducer assembly 200 may include a single protruding interface port 206 configured and shaped such that it may be threaded into a standard bleed valve port (such as port 102 of FIG. 1A) and sealed (similar to sealing the front cone 110 of the bleed valve 106 when it is pressed against a corresponding surface of the wall portion 104 to seal the port 102, as shown in FIG. 1A).

In accordance with certain example implementations of the disclosed technology, and as shown in FIG. 2, an adaptor 208 may be welded 210 to the back of the port 206. In certain example implementations, a glass metal seal header 212 may be welded to the adapter, such as described in U.S. Pat. No. 5,999,082, which is incorporated herein by reference as if presented in full. In certain example implementations, the header 212 may be an oil filled header. In certain example implementations, the header 212 may be leadless, such as described in U.S. Pat. No. 5,955,771, which is incorporated herein by reference as if presented in full. In certain example implementations of the disclosed technology, the header 212 may be any other type, depending on the characteristics needed. According to an example implementation of the disclosed technology, a pressure sensing chip 214 may be mounted to the header 212.

According to an example implementation of the disclosed technology, and as briefly mentioned above, the bleed valve port 202 in the body 204 of the assembly may be configured to accept a standard bleed valve 216 (which in certain example implementations may be the same or similar as the bleed valve 106 as shown in FIGS. 1A and 1B). In a similar way as described above with respect to FIG. 1B, the bleed valve 216 can be selectively backed out (unscrewed, etc.) to remove air from the system through the body of the transducer. Furthermore, in certain example implementations, the bleed valve 216 may also be used to bleed air from the cavity 218 of the transducer assembly 200 so that no air is trapped in the transducer assembly 200, or so that the amount of trapped air can be reduced.

In accordance with certain example implementations of the disclosed technology, the interface port 206 may be characterized by an outer shape configured equivalent to an outer shape of a bleed valve.

In certain example implementations, the bleed valve port 202 in the body 204 may be configured to have an inner shape substantially equivalent to an outer shape of a bleed valve 216.

Figure 3:
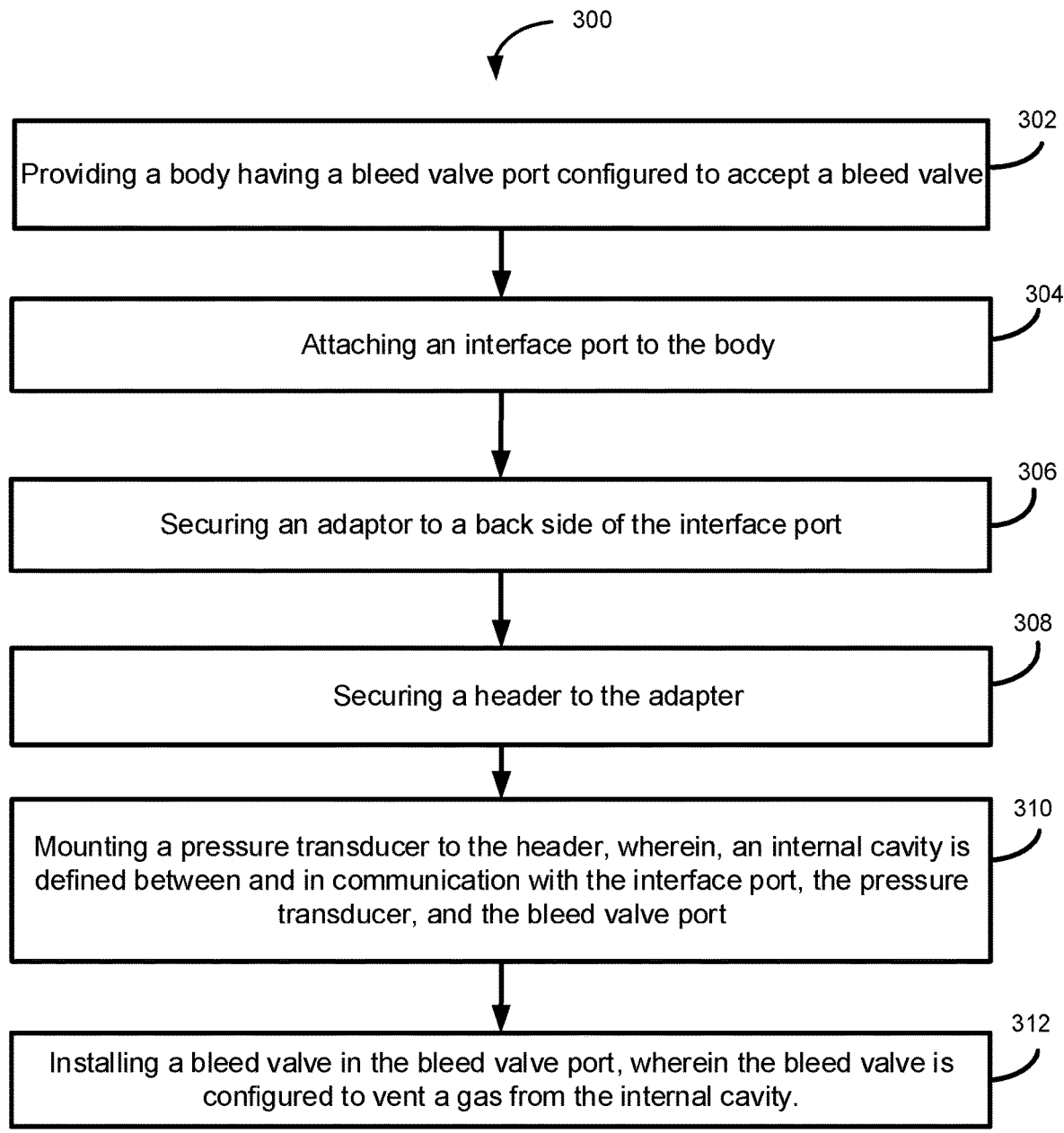
FIG. 3 is flow diagram of a method 300, according to an example implementation of the disclosed technology.

FIG. 3 is flow diagram of a method 300, according to an example implementation of the disclosed technology. In block 302, the method 300 includes providing a body having a bleed valve port configured to accept a bleed valve. In block 304, the method 300 includes attaching an interface port to the body. In block 306, the method 300 securing an adaptor to a back side of the interface port. In block 308, the method includes securing a header to the adapter. In block 310, the method 300 includes mounting a pressure transducer to the header, wherein, an internal cavity is defined between and in communication with the interface port, the pressure transducer, and the bleed valve port. In block 312, the method 300 includes installing a bleed valve in the bleed valve port, wherein the bleed valve is configured to vent a gas from the internal cavity.

In certain example implementations, the header 212 can comprise a glass. In certain example implementations, the header 212 can comprise a glass seal. In accordance with certain example implementations of the disclosed technology, the header may accept a back portion of the pressure transducer 214 such that the pressure transducer 214 may be secured and sealed to the header 212.

According to an example implementation of the disclosed technology, the interface port 206 may be configured to have substantially the same shape as a portion of a standard bleed valve.

According to the various example embodiments disclosed herein, the interface port 206 may be a single male interface port configured interface with a corresponding female bleed-valve port, for example, associated with a separate device or machine (not shown, but may be represented by the wall portion in FIG. 1). In certain example implementations, the transducer assembly 200 may interface directly with the female bleed-valve port of a separate device, machine, pipe, header, etc., in a same or similar fashion as a bleed valve would interface with the female bleed-valve port.

According to an example implementation, the interface port 206 can include a bore extending axially from a first side to a second side of the interface port 206 such that fluid, for example, may enter the internal cavity 218 of the transducer assembly 200 via the interface port 206.

In accordance with certain example implementations of the disclosed technology, the bleed valve port 202 in the body 204 may be configured to have an inner shape configured substantially equivalent to an outer shape of a standard bleed valve.

In certain example implementations, securing the adaptor 208 to the back side of the interface port 206 can include joining the adaptor to the back side of the interface port with a weld 210.

In certain example implementations, securing the header 212 to the adapter 208 can include joining the header to the adapter with a weld and/or glass seal.

Figure 4:
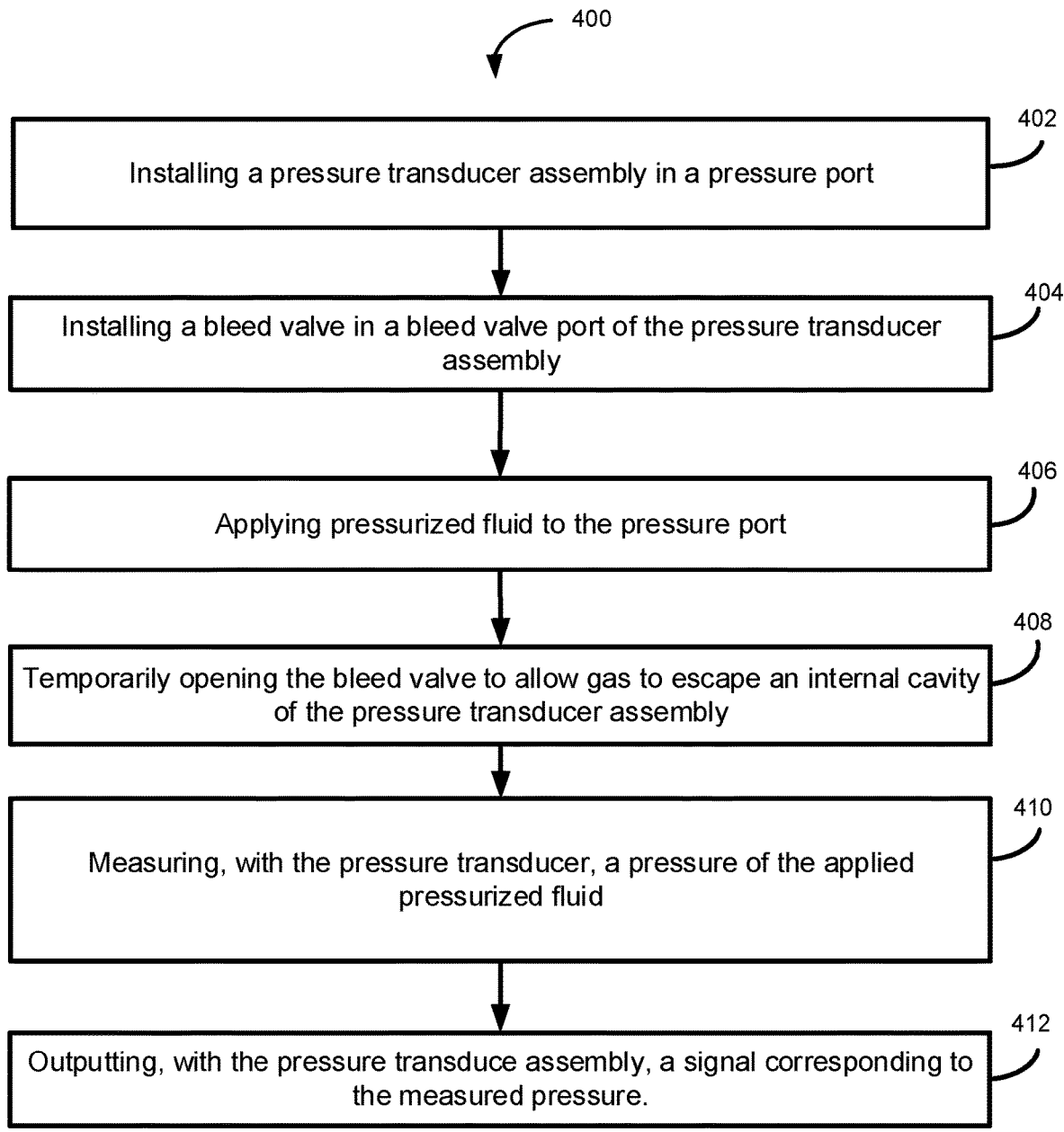
FIG. 4 is flow diagram of a method 400, according to an example implementation of the disclosed technology.

FIG. 4 is flow diagram of a method 400 for bleeding gas from a pressure port and measuring a pressure of a fluid in communication with the pressure port. In block 402, the method 400 includes installing a pressure transducer assembly in a pressure port. In block 404, the method 400 includes installing a bleed valve in a bleed valve port of the pressure transducer assembly. In block 406, the method 400 includes applying pressurized fluid to the pressure port. In block 408, the method 400 includes temporarily opening the bleed valve to allow gas to escape an internal cavity of the pressure transducer assembly. In block 410, the method 400 includes measuring, with the pressure transducer, a pressure of the applied pressurized fluid. In block 412, the method 400 includes outputting, with the pressure transduce assembly, a signal corresponding to the measured pressure.

Certain example implementations of the disclosed technology may provide certain technical benefits, particularly for systems in which pressure of liquid media is measured. For example, one benefit of the system is the unanticipated advantage of allowing for the bleeding of air from the transducer body so that little or no air is trapped inside the transducer body. Another technical benefit includes the reduction of the number of ports that need to be installed in a system since the transducer and the bleed valve may share a common port in communication with the internal liquid in the system. Such technical advantages may help increase the reliability of the system, reduce bulk, and in some cases, may allow the transducer assembly 200 to be installed in an existing bleed valve port.

As discussed in the background section above, it is well known that air in a transducer cavity can affect the frequency response of the measurement. Certain example implementations of the disclosed technology may enable an easy method for fully purging the system of air, including gasses in the transducer cavity, to get the maximum possible frequency response. Certain example implementations of the disclosed technology may further allow for filters inside the transducer for controlling frequency response, such as described in U.S. Pat. No. 9,470,596, which is incorporated herein by reference as if presented in full.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Throughout the specification and the claims, the following terms take at least the meanings explicitly associated herein, unless the context clearly dictates otherwise. The term "connect," "connecting," and "connected" mean that one function, feature, structure, or characteristic is directly joined to or in communication with another function, feature, structure, or characteristic. The term "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way but may also be configured in ways that are not listed.

As disclosed herein, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Although this disclosure describes specific examples, embodiments, and the like, certain modifications and changes may be made without departing from the scope of the disclosed technology, as set forth in the claims below. For example, although the example methods, devices and systems, described herein are in conjunction with a pressure transducer or a sensor, the skilled artisan will readily recognize that the example methods, devices or systems may be used in other methods, devices or systems and may be configured to correspond to such other example methods, devices or systems as needed. Further, while at least one example, embodiment, or the like has been presented in the detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments or examples are not intended to be construed as a critical, required, or essential feature or element of any or all of the claims.

The invention claimed is:

1. A transducer assembly, comprising:
    an interface port configured to receive a media;
    an adapter welded to at least a portion of the interface port;
    a bleed valve body welded to at least a portion of the interface port and at least partially forming an internal cavity of the transducer assembly, the bleed valve body joined with a bleed valve, wherein the bleed valve body is configured to have an inner shape substantially equivalent to an outer shape of the bleed valve;
    a header joined to the bleed valve body and the adapter, and at least partially forming the internal cavity, the header comprising a glass and wherein the header is configured to accept a pressure transducer;
    a pressure transducer mounted on the header within the internal cavity and configured to measure a pressure of the media;
    wherein the bleed valve is configured to controllably vent a gas from the internal cavity.

2. The transducer assembly of claim 1, wherein the bleed valve is configured to manually vent the gas from the internal cavity.

3. The transducer assembly of claim 1, wherein the interface port is characterized by a male protrusion.

4. The transducer assembly of claim 1, wherein the interface port is a single interface port.

5. The transducer assembly of claim 1, wherein the interface port comprises a bore extending from a first side to a second side of the interface port.

6. The transducer assembly of claim 5, wherein the bore is in communication with the internal cavity.

* * * * *